March 28, 1967

J. V. HARMON 3,311,263

METHOD AND APPARATUS FOR STRIPING
AND COLORING EXTRUDED MATERIALS

Filed June 11, 1965

INVENTOR.
JAMES V. HARMON
BY *Arnold E. Lund*
ATTORNEY

INVENTOR.
JAMES V. HARMON

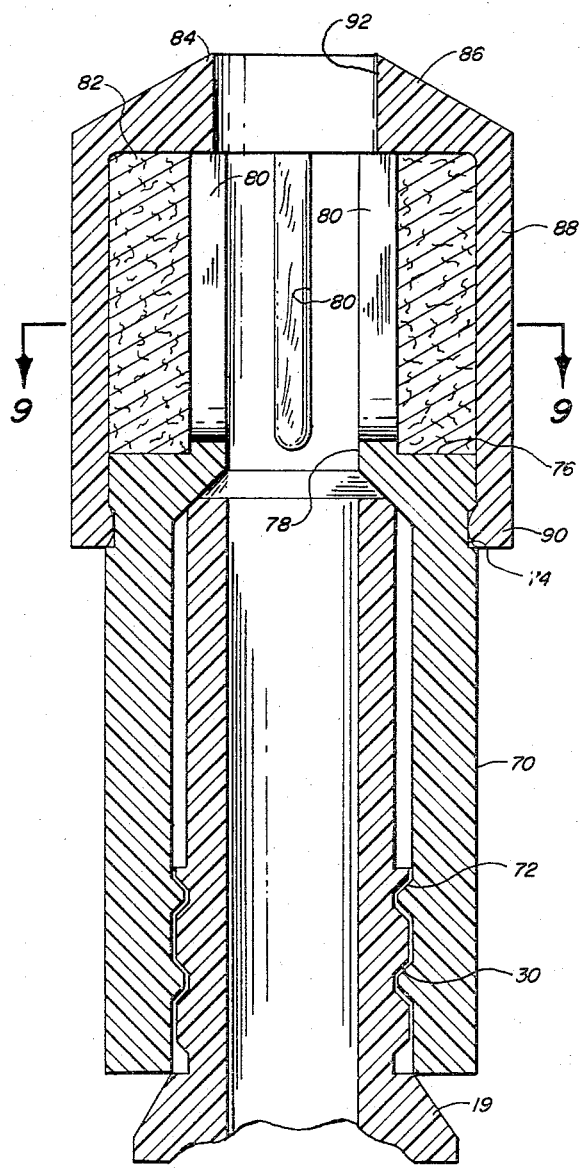
FIG. 8
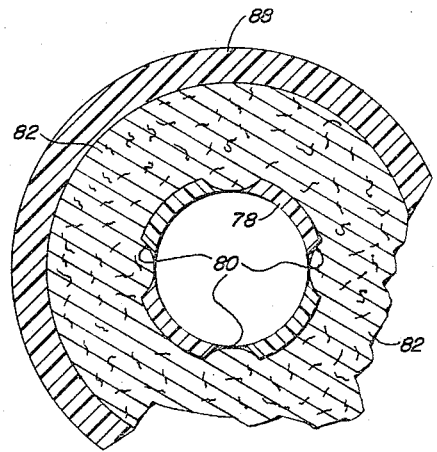
FIG. 9
INVENTOR.
JAMES V. HARMON
ATTORNEY

United States Patent Office 3,311,263
Patented Mar. 28, 1967

3,311,263
METHOD AND APPARATUS FOR STRIPING AND COLORING EXTRUDED MATERIALS
James V. Harmon, New Brighton, Minn., assignor to The Pillsbury Company, Minneapolis, Minn., a corporation of Delaware
Filed June 11, 1965, Ser. No. 463,095
9 Claims. (Cl. 222—1)

The present invention relates to a method and apparatus for applying stripes or surface coloring to semi-liquid materials such as frosting mixes, toothpaste and the like as it is extruded from a container. By the term "paste" as used herein I mean a solid material which will hold a preformed shape but which exhibits fluid characteristics under pressure and is capable of being extruded through an aperture.

A great many processes and devices have been previously proposed for applying coloring material in the form of stripes against the visibly contrasting background surface of an extruded ribbon of toothpaste, frosting or the like. The production of striped toothpaste has been successfully accomplished using the apparatus described in Patent Nos. 2,218,092; 2,944,704 and 2,925,938. The general approach in this system and many others is to provide a first mass of paste which is usually white or colorless in the main body portion of a toothpaste tube and a second body of paste having a visibly contrasting color such as red located at the neck of the tube and separated from the main mass of paste by a movable plunger or spacer which is free to slide toward the outlet of the tube. When the main body portion of the tube is compressed, the colorless paste therein will apply pressure against the plunger causing a portion of the brightly colored paste to be extruded through suitable orifices as a surface layer of colored paste upon the colorless paste. A generally similar approach has been proposed for use in connection with frosting mix which is extruded from an aerosol can as shown in Patent Nos. 3,135,428 and 2,705,463. The latter devices are relatively large in size, cumbersome to employ and the receptacle containing the colored striping frosting is an item of substantial expense. A further problem derives from the fact that a substantial volume of frosting must be stored within the auxiliary striping container and once the frosting therein has been consumed the container is either difficult or virtually impossible to refill. In the alternative, the auxiliary colored frosting container must be discarded which is a decided disadvantage in view of its substantial cost. Moreover, the preparation and packing of two different colored masses of paste within the same package and the proper placement of the plunger within the container adds to the cost of raw materials, assembly time and other related manufacturing expenses. A variety of other coloring and striping devices have been previously proposed and these, however, have been unsatisfactory for the purpose of the present invention or are either costly to manufacture or ineffective in operation.

In view of the shortcomings of the prior art, it is one object of the present invention to provide an improved coloring and striping apparatus and method for applying surface coloration or stripes to self-supporting ribbons or bands of extruded paste.

Yet another object of the invention is the provision of a striper for extruded pastes which includes no moving parts and has been simplified through the elimination of components heretofore employed.

Still another object of the invention is the provision of an improved coloring device or striper which has been vastly reduced in size compared with prior stripers of the type described.

A still further object of the present invention is the provision of an improved striper or the like for extruded pastes wherein only one mass of paste is employed.

A still further object of the present invention is the provision of an improved striping device or the like for extruded pastes such as toothpaste, canned frosting mix and the like wherein the striping device is small enough in size and low enough in cost to be considered entirely disposable.

Still another object of the invention is the provision of the improved striping apparatus for extruded pastes which can be quickly and easily removed and replaced with a similar striping appliance adapted to apply stripes of a different color whereby the user can conveniently change colors as often as desired.

Yet another object of the present invention is the provision of an improved method and apparatus for applying stripes to toothpaste as it is extruded wherein the requirement for moving parts is eliminated and the number and complexity of parts is substantially reduced as compared with those employed in a conventional toothpaste tube of the type heretofore used for producing striped toothpaste.

These and other more detailed and specific objects will become apparent in the light of the following specification and accompanying drawings wherein:

FIGURE 8 is a vertical sectional view of a striping apparatus embodying yet another form of the invention.

FIGURE 9 is a transverse sectional view taken on line 9—9 of FIGURE 8.

Figure 1:
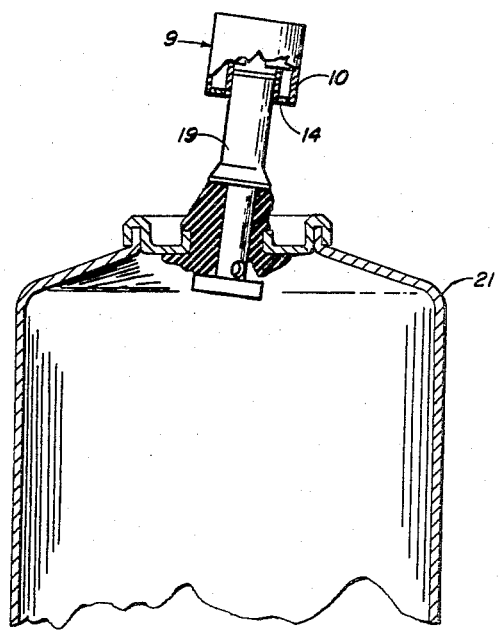
FIGURE 1 is a partial vertical sectional view of an aerosol frosting mix storage and dispensing can with a striping appliance in accordance with the invention mounted thereon.
Figure 3:
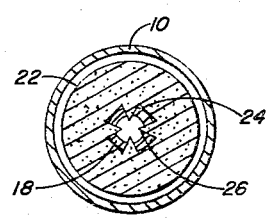
FIGURE 3 is a transverse horizontal sectional view taken on line 3—3 of FIGURE 2 but on a reduced scale.
Figure 2:
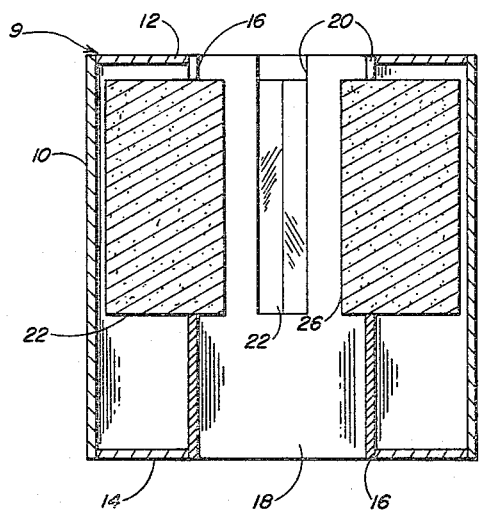
FIGURE 2 is a greatly enlarged vertical sectional view of the striping appliance of FIGURE 1.

Refer now to FIGURES 1–8. The striping device 9 includes a casing consisting of a cut section of plastic tubing 10 having a pair of flat die cut end pieces 12 and 14 forced into each end of the tube 10. Each of the pieces 12 and 14 is provided with a circular opening 16 at the center. Extending between the end wall 12 and 14 is a tube 18 having longitudinally extending cuts 20 of an appropriate size to fit frictionally over the extrusion nozzle 19 of a can 21. A piece of felt or other absorbant material 22 in the form of a disc having a center opening 24 cut in the general form of a maltese cross is placed between the outer tube 10 and the center tube 18 with the projections 26 extending centrally through the cut openings 20. A suitable liquid coloring agent or stain saturates the felt disc 22. The liquid stain is highly fluid in consistency. It is watery in other words and capable of passing by capillary action from one portion of the disc 22 to another. The color therein is sufficiently concentrated so that after dilution to several times its original volume the stain will still exhibit a strong coloration. Because the stain is stored and applied in a concentrated form in comparison with a colored paste, a striper embodying the invention can intensely color a large volume of extruded material in spite of its small size. I have found for example that a striper of the kind shown in FIGURES 1–3 will produce intense stripes after two cans each containing 4½ oz. of frosting have been striped.

During operation, when the frosting is extruded, the coloring liquid which saturates disc 22 is transferred to and colors the surface of the frosting where the frosting contacts the centrally extending projections 26 to produce a series of parallel stripes which contrast with the color of the frosting and extend parallel stripes longitudinally of the extruded frosting material. The coloring liquid can comprise a suitable aqueous solution of a food dye.

Figure 4:
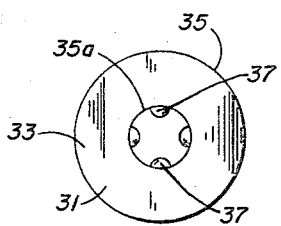
FIGURE 4 is a plan view of a striping apparatus in accordance with a modified form of the invention.

Refer now to FIGURE 4 which illustrates another form of the invention. The device of FIGURE 4 consists of a disc 31 having a flat top wall 33, a flat bottom wall (not shown) parallel to the top wall 33 and a cylindrical outside wall 35. In the center of the disc 31 is a cylindrical opening 35a extending between the top wall 33 and the bottom wall. The opening 35a is of an appropriate size to fit frictionally over the extrusion nozzle 19. Within opening 35a are rigidly secured a plurality of circumferentially spaced solid soluble stain bodies 37. When the device is used, it is mounted as the device of FIGURES 1–3. The extruded frosting passes across the surface of the stain bodies 37, partially dissolves the surface thereof and absorbs coloration from the bodies onto its own surface.

Figure 5:
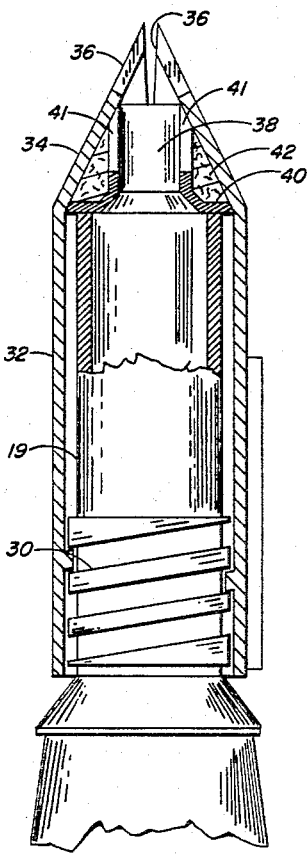
FIGURE 5 is a vertical sectional view of a striping device in accordance with another modified form of the invention.
Figure 6:
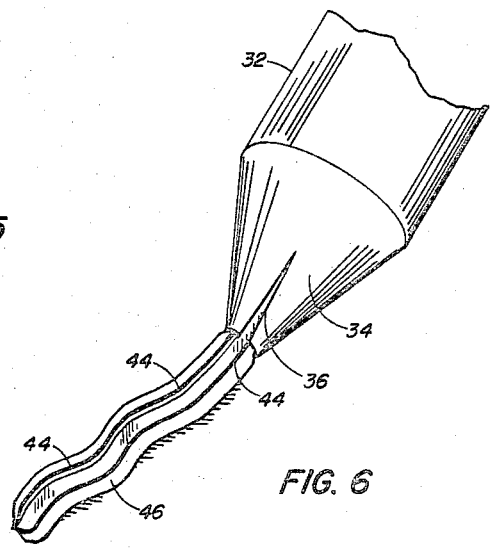
FIGURE 6 is a partial perspective view of the device of FIGURE 5 as a ribbon of striped frosting is extruded.

Refer now to FIGURES 5 and 6 which illustrate another form of the invention. In the form of the invention shown in FIGURE 5, the extrusion nozzle 19 is provided with threads 30 to which a hollow cylindrical coloring nozzle 32 is connected. The free end of the coloring nozzle 32 comprises a hollow conical section 34 having a plurality of longitudinally extending V shaped slots 36. Any number of slots 36 can be employed, from 4 to 8 will be the usual number. Mounted concentrically within the conical portion 34 is a tubular casing member 38. The casing 38 includes a laterally extending circular flange 40, the lower end of which abuts against the free end of the nozzle 19 such that when the nozzle 19 is threaded into coloring nozzle 32, the casing 38 will be forced upwardly to a seated position within the conical portion 34 of nozzle 32. The casing 38 is provided with a plurality of longitudinally extending circumferentially spaced grooves or slots 41, two such slots in this case being shown. A cone-shaped hollow body of highly absorbent cellular material, such as felt 42, is placed between the casing member 38 and the wall of the conical section 34. This felt material 42 is saturated with a suitable highly concentrated liquid coloring material or stain. A water base stain is preferred to an oil base stain for use with frosting. Any of a variety of known stains can be employed and the precise requirements of the stain will depend upon a number of factors such as whether or not the stain must be edible, the color of the stain, the composition of the extruded paste and the like.

When the apparatus is to be used the nozzles 32 and 19 are pressed manually to one side with respect to the can 21 in the usual manner causing the paste within the can to be expelled through the nozzle 19. The paste will pass into the casing 38 and will immerge from the open end thereof and will be extruded laterally to some extent through the longitudinally extending openings 36. This will give the frosting a preformed star configuration as seen in cross section. As the frosting is extruded, portions of it will contact the felt 22 through the slots 41. Where this contact is made, stripes 44 will be produced on the surface of the extruded frosting 46 as seen in FIGURE 6.

Figure 7:
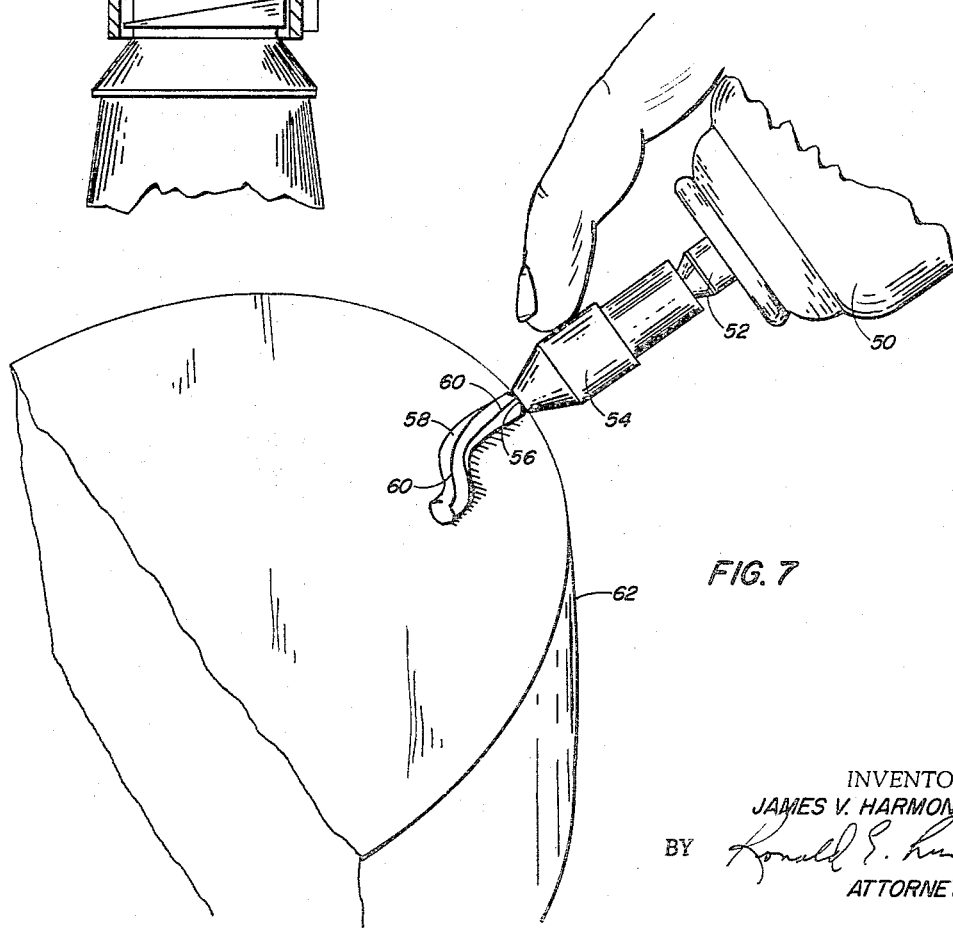
FIGURE 7 is a partial perspective view of paste material as it is extruded through a striping appliance in accordance with another modified form of the invention.

Refer now to FIGURE 7 which illustrates another form of the invention. The apparatus of FIGURE 7 includes a vessel for example, a can 50 holding a paste such as frosting under pressure with the propellant comprising suitable compressed gas. From the can 50 the frosting is extruded through a nozzle 52 thence through a striping appliance 54 having an outlet opening 56 of a circular cross section. The striping appliance 54 is identical to that of FIGURES 5 and 6 except that no slots 36 are provided and the extrusion orifice 56 has a round, uninterrupted cross-sectional configuration. In operation, when the user presses the nozzle 54 towards one side, the frosting material from within the can 50 is extruded as shown at 58 to form a cylindrical band having a plurality of stripes 60 extending longitudinally thereof. The striped frosting 58 is used to decorate the surface of bakery goods such as a cake 62.

Refer now to FIGURES 8 and 9 which illustrate still another embodiment of the invention. In the embodiment of the invention illustrated in FIGURES 8 and 9, a tubular nozzle member 70 is provided with internal threads 72 which are secured when the appliance is used to the threads 30 of the nozzle 19. The nozzle 70 includes a circumferentially extending groove 74 and a shoulder 76. Extending longitudinally adjacent the inward edge of the shoulder 76 is an integral tubular sleeve 78 having a plurality of longitudinally extending laterally spaced groove 80. Positioned concentrically over the sleeve 78 is a highly porous absorbent material such as a hollow cylindrical felt packing 82 saturated with a suitable liquid stain or dye of a type described above. The felt material 82 is enclosed within a generally cup-shaped cover 84 including an end wall 86 and an integral tubular side wall 88 with a centrally extending flange 90 which is snap-fitted into the groove 74. In the end wall 86 is a cylindrical extrusion aperture 92 which communicates with the center of the sleeve 78.

In operation, the paste such as frosting extruded upwardly through the nozzle 19 will pass into the sleeve 78 and contact the adjacent portions of the felt 82 which is exposed through the slots 80. The surface of the frosting will in this manner be colored by absorbing the stain in selected circumferentially spaced areas and thereby produce longitudinally extending colored stripes on a visibly contrasting background defined by the surface of the extruded frosting.

Figure 10:
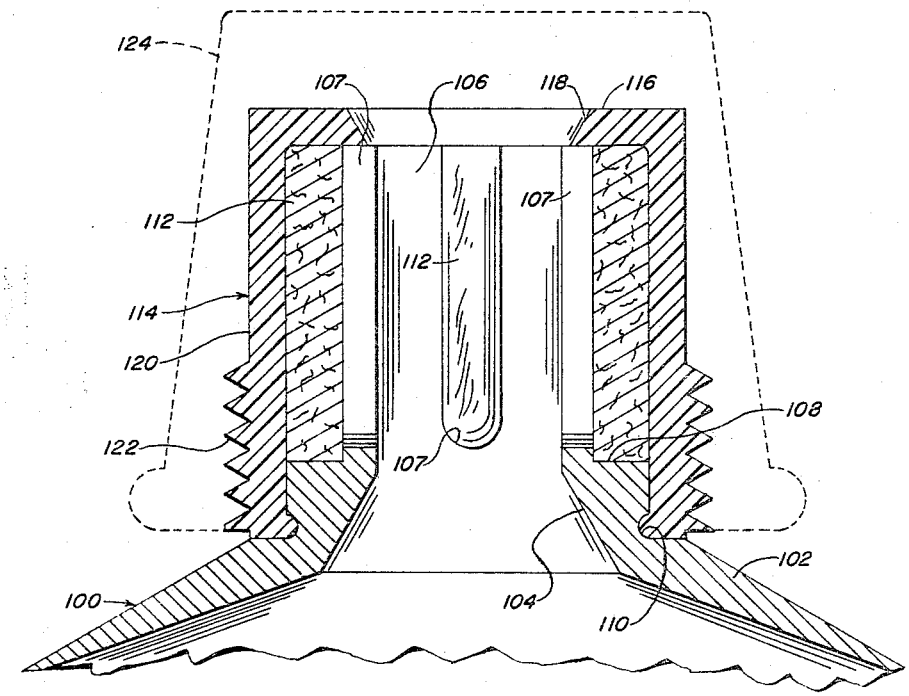
FIGURE 10 is a partial greatly enlarged vertical sectional view of a modified form of my invention to be used for applying stripes to toothpaste.

Refer now to FIGURE 10 which illustrates another embodiment of the invention. The apparatus in FIGURE 10 includes a flexible container 100 which in this instance comprises the outlet end of the toothpaste tube formed from lead or other suitable material. The container 100 includes a shoulder 102 which communicates through an outlet duct 104 with a tubular nozzle portion 106 having an external laterally extending circular shoulder 108. The neck 106 is provided with longitudinally extending spaced grooves 107. On the outside of the neck 106 below the shoulder 108 is a circumferentially extending groove 110. Mounted around the neck 106 is an adsorbent material such as felt 112. Mounted over the felt 112 is a cover 114 which includes an end wall 116 having an opening 118 that communicates with the sleeve 106 and tubular side wall 120 provided with threads 122 at the lower end thereof. When the toothpaste tube is not in use, a removable cap 124 of conventional construction is mounted over the cover 114 and secured thereto by means of threads 122.

When the apparatus of FIGURE 10 is used, the paste within the tube 100 is extruded through the neck 106. Portions of the paste contact the parts of the felt 112 exposed through the slots 107. As this takes place the liquid stain contained within the felt 112 is transferred by capillary action onto the surface of the paste passing therethrough. In this way the surface of the paste is colored in circumferentially spaced sections corresponding to the locations of the slots 107.

The invention will be better understood by reference to the following examples.

*Example 1*

A can of aerosol propelled frosting packaged in metal cans such as the frosting manufacture by the assignee and sold under the registered trademark "Deco-Writer" is provided with a striping appliance as described in connection with FIGURES 8 and 9. The porous material comprises a felt ring having height of ¼ in., an outside diameter of ¼ in. and having an opening through the center of 3/16 in. saturated with an aqueous solution of a U.S. certified food dye such as that obtained from the McCormick & Schilling Co., Inc., San Francisco, California.

*Example II*

A tube of white toothpaste is provided with a striping appliance in accordance with the FIGURES 9 and 10 using a felt dye retaining medium consisting of a felt ring having outside diameter of ¼ in., an inside diameter of 3/16 in. and a height of 3/16 in. The felt disc is saturated with an aqueous solution of a U.S. certified food color such as a red certified food color available from the McCormick & Schilling Co., Inc., San Francisco, California.

*Example III*

A striping appliance is prepared as described in connection with Example I except that an emulsifying agent present in the amount of 1% of the coloring material is employed. The emulsifying agent comprises a sodium salt of a fatty acid.

It is apparent that many modifications and variations of this invention as hereinbefore set forth may be made without departing from the spirit and scope thereof. For example, the sleeve 78 can be omitted when it is desired to color the entire exposed surface of the extruded material thereby changing its color. The specific embodiments described are given by way of example only and the invention is limited only by the terms of the appended claims.

I claim:

1. A method for coloring the surface of a paste as it is extruded through an aperture with a solid dye comprising providing soluble dye formed from a solid material at circumferentially spaced locations adjacent the aperture, forcing the paste through the aperture into contact with the solid dye to disperse said dye on said paste and extruding the paste through the aperture to produce an extruded band having a preformed shape with colored areas thereon corresponding to the locations of the dye on the aperture.

2. An apparatus for producing striped, extruded paste comprising a supporting member with a plurality of circumferentially spaced circularly arranged solid coloring elements thereon soluble in the paste, a means for extruding a paste to contact the coloring elements with the coloring elements abutting the surface of the paste as the paste is extruded thereby to form colored areas on the surface of the paste at circumferentially spaced locations corresponding to the relative spacing between the elements.

3. An apparatus for producing striped, extruded paste comprising a hollow supporting member with a plurality of circumferentially spaced circularly arranged openings therein, a porous medium in the hollow member, a runny liquid stain material saturating the porous medium, a means for extruding a paste to contact the coloring medium with the portions of the medium exposed through the openings in contact with the surface of the paste as the paste is extruded to form colored areas on the side of the paste at circumferentially spaced locations corresponding to the relative spacing between the openings.

4. An apparatus for producing striped frosting comprising in combination a support housing, an absorbent highly porous material supported within the housing, a sleeve in the housing disposed centrally, of the porous material, a liquid stain saturating the porous material and capable of transferring from one part of the material to another by capillary action, a plurality of circumferentially spaced openings in the sleeve, an inlet opening communicating with the one end of the sleeve to receive frosting and an outlet opening at the opposite end of the sleeve through which the frosting is exhausted whereby the stain imparts coloration of the surface of the extruded frosting.

5. An apparatus for producing striped toothpaste comprising in combination a hollow support housing, an absorbent highly porous material supported within the housing, a liquid stain saturating the porous material, a sleeve in the housing within the material, a plurality of circumferentially spaced openings in the sleeve and an inlet opening communicating with the one end of the sleeve to receive toothpaste and an outlet opening at the opposite end of the sleeve for exhausting toothpaste having stripes applied by transfer of the stain to the surface thereof.

6. An apparatus for producing striped paste comprising in combination a hollow support housing of a fixed volume, an absorbent highly porous felt pad supported within the housing, a sleeve in the housing within the felt pad, a liquid coloring agent in the felt pad, a plurality of circumferentially spaced openings in the sleeve, an inlet opening communicating with the one end of the sleeve to receive frosting and an outlet opening at the opposite end of the sleeve for exhausting the paste with stripes on the surface thereof formed from stain transferred to the paste through the openings from the felt pad.

7. A device for striping toothpaste comprising in combination a toothpaste tube containing a supply of toothpaste, an outlet duct communicating with the interior of the tube, said duct having a plurality of circumferentially spaced openings therein, a highly porous absorbent material containing a liquid dye positioned around the sleeve and communicating with the interior thereof through the openings and the housing enclosing the absorbent material.

8. The apparatus according to claim 7 wherein the housing is provided with threads for securing a cap to the tube.

9. A method of coloring the surface of a paste-like material with a liquid dye as the paste is extruded through an aperture comprising:
(a) providing at least one porous member saturated with a liquid coloring material adjacent the aperture,
(b) extruding the paste through the aperture into contact with the porous member to thereby expel the paste from the aperture in the form of an extruded band having a preformed shape and
(c) permitting the liquid coloring material to migrate by capillary action to the surface of the paste and
(d) causing the liquid to stain the surface of the paste to thereby produce colored areas thereon corresponding to the location of each porous member.

References Cited by the Examiner

UNITED STATES PATENTS

| 608,958 | 8/1898 | Ferraioli | 222—94 |
| 2,914,220 | 11/1959 | Marraffino | 222—94 |
| 2,925,938 | 2/1960 | Parsons | 222—94 |

OTHER REFERENCES

Washington Daily News, February 26, 1958, page 24, Article, "Striped for Action."

ROBERT B. REEVES, *Primary Examiner.*

HADD S. LANE, *Examiner.*